Jan. 20, 1959 L. E. CAPEK ET AL 2,869,153
RETRACTABLE TAP FEED MECHANISM OPERATIVE UPON
UNDUE AXIAL FORCE ON THE SPINDLE
Filed March 1, 1955 2 Sheets-Sheet 1
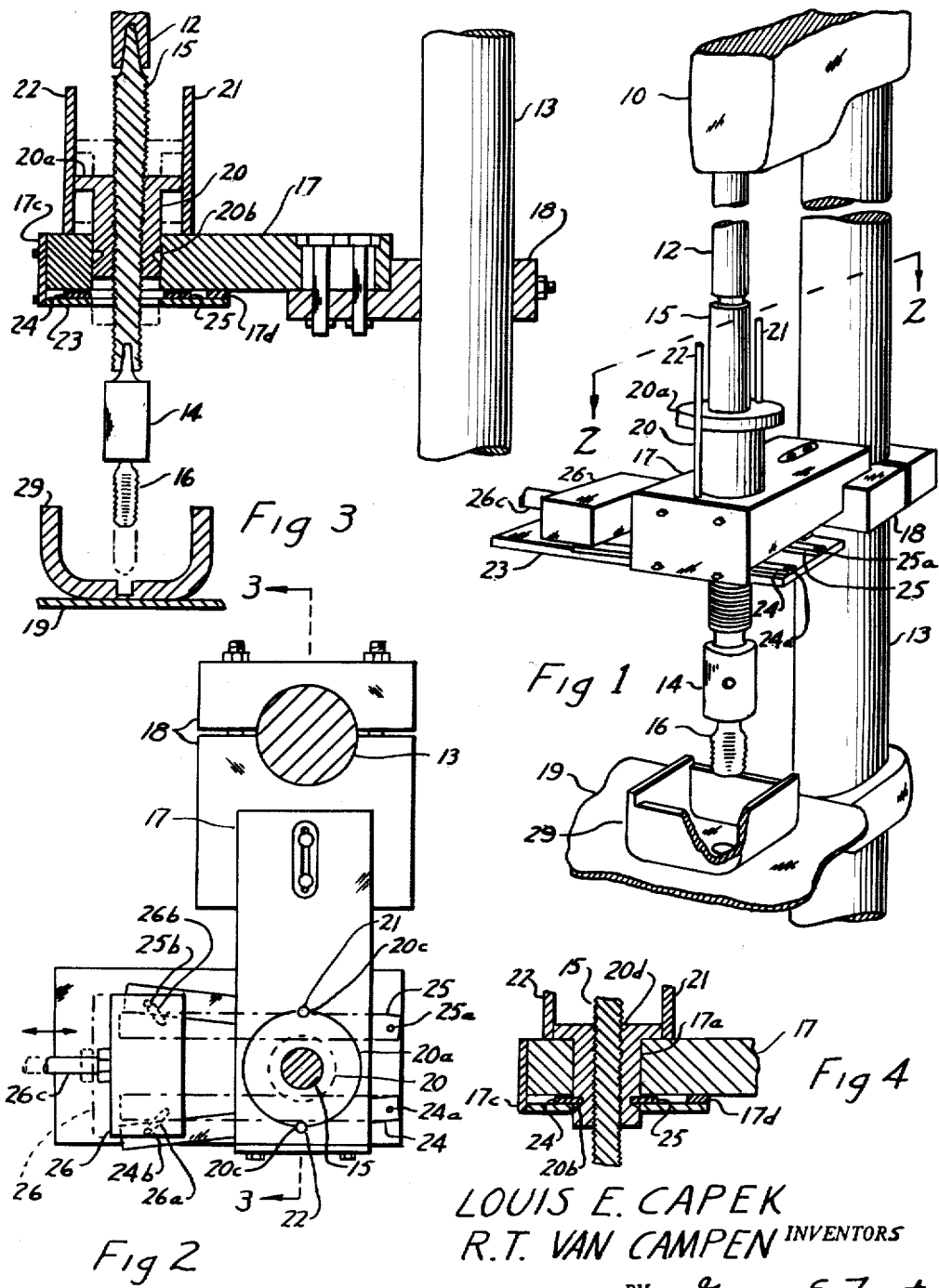
LOUIS E. CAPEK
R. T. VAN CAMPEN INVENTORS
BY George E. Frost
ATTORNEY

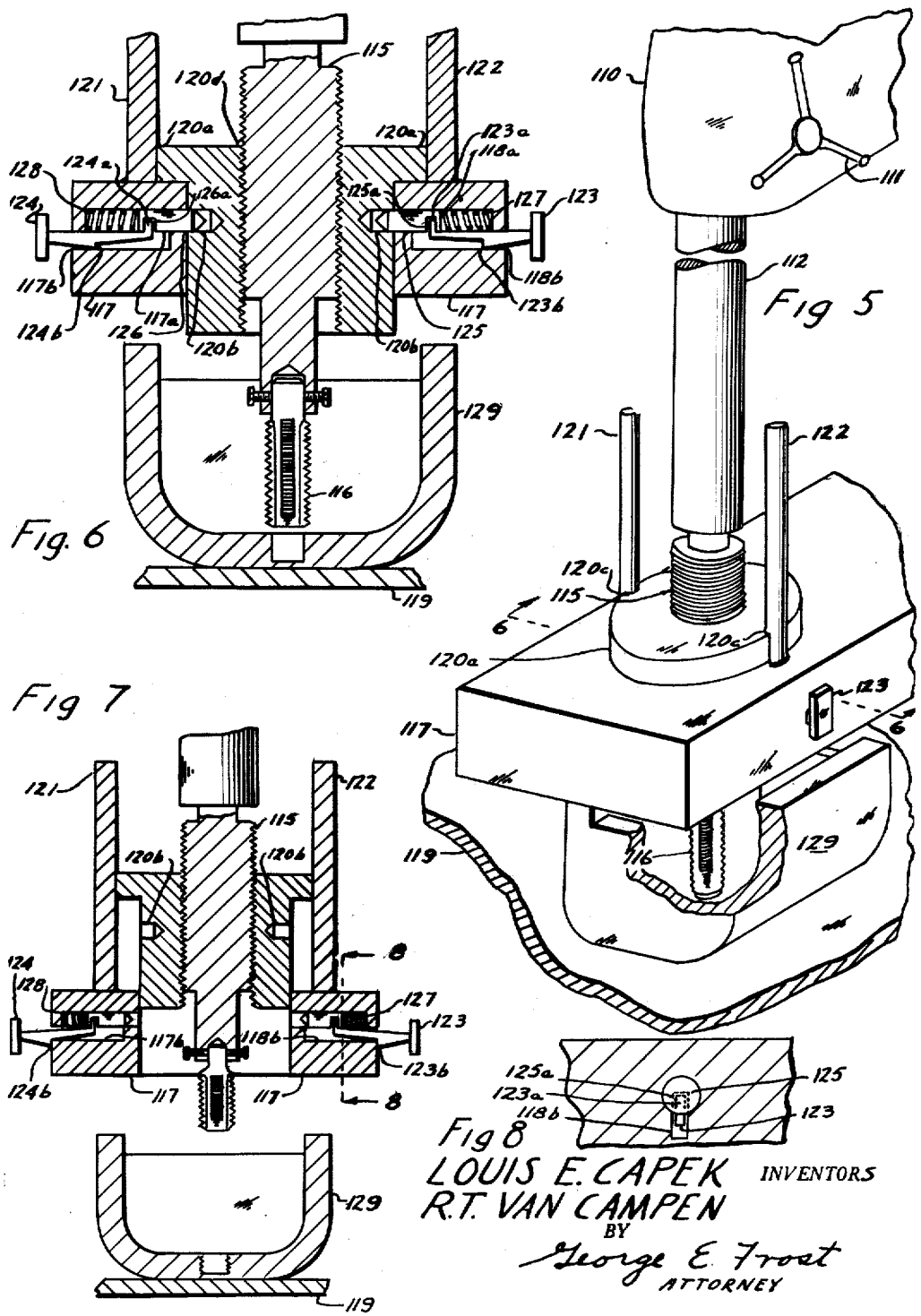

2,869,153

RETRACTABLE TAP FEED MECHANISM OPERATIVE UPON UNDUE AXIAL FORCE ON THE SPINDLE

Louis E. Capek and R. T. Van Campen, Bangor, Mich.

Application March 1, 1955, Serial No. 491,252

2 Claims. (Cl. 10—135)

Our invention relates to an improved positive feed device for tapping mechanisms which permits rapid free travel of the tap down to and away from the work while at the same time providing the desired uniform slow advancing and retracting motion of the tap when in the work.

Conventional tapping machines or drills adapted for tapping operations may be of the sensitive type where the tool is fed into the work by manual control. In this type machine the tap, once started, follows its own lead. Alternatively, the machines are of the positive feed type where the tap is positively advanced and retracted as required to form the threads. The usual method of providing the positive feed action in this latter type of machine is by means of a lead screw and a lead screw nut. The lead screw, which fits into the spindle and rotates with it, is externally threaded with threads of a pitch corresponding to the threads desired in the work to be tapped. A tap is affixed to the lead screw at the end opposite the spindle to rotate as well as advance and retract in unison with the spindle and lead screw assembly. The lead screw nut is fixedly supported and threadedly receives the lead screw. The rotational motion of the spindle and lead screw assembly causes these parts to screw down or up through the fixed lead screw nut, screwing the tap into or out of the work at the proper feed speed.

These machines may be provided with automatic controls so that the work cycle can be pre-set according to the nature of the work to be performed. The controls are so arranged that after the tap has cut into the work to the desired depth, the direction of rotation of the spindle is automatically reversed and the tap retracts from the work. Similarly, after the tap has reached a desired height above the work the drive motor can be automatically stopped or reversed, as desired.

In conventional machines, where the lead screw nut is at all times in a fixed position relative to the work, it is necessary for the threaded lead screw to screw down or up through the lead screw nut at the same speed when the tap is disengaged from the work as when it is engaged in the work. Thus after the cutting operation has been completed and the tap has been screwed up out of the work piece, it is necessary for the lead screw to screw up through the lead screw nut at the slow rate of retraction required for removal of the tap from the work until there is sufficient clearance under the tap for removal and replacement of the work. The tap must thereafter be advanced at the same slow rate until it is in position over the new work piece.

This relatively slow axial movement of the lead screw assembly results in a considerable delay while waiting for the tap to ascend far enough above the work piece for removal. A similar delay is encountered while waiting for the tap to feed down again to the new piece. This delay becomes acute when the configuration of the work piece requires considerable non-cutting travel of the spindle assembly for clearance of the tap. For example, after cutting threads in a hole at the bottom of a box-shaped piece, the lead screw must screw up through the lead screw nut, at the comparatively slow "feed" rate, until the tap clears the edge of the box so that the piece can be removed. After insertion of the new piece, the lead screw must screw down through the nut at the feed rate, even though most of the vertical movement of the tool is non-cutting travel. On a production basis, the productive cutting time may thus be limited to a relatively small portion of the actual time consumed in the operation. In mass production operations the non-productive time accumulates to considerable proportions.

In the present invention, the time consumed in non-cutting travel of the tap in the tapping operation is materially reduced by a device which obviates the necessity of moving the tool to and from the work piece at the controlled feed rate and requires the engagement of the feed mechanism only while the tool is cutting or unscrewing from the work.

In brief, this is accomplished by means of a lead screw nut which is held in a fixed position in relation to the work only during the time the tap is in actual engagement with the work. A conventional lead screw, externally threaded with threads corresponding in pitch to the pitch desired in the work, is mounted in the spindle to rotate with the spindle. At the opposite end of the lead screw, a conventional tap is affixed which rotates with the lead screw. The lead screw is threadedly engaged in a lead screw nut, which is removably fixed in relation to the work piece. While the tap is away from the work the assembly of spindle, lead screw, tap and lead screw nut is unrestrained in its axial travel. When the assembly is lowered to the point where the tap is immediately above the work piece, the flange on the lead screw nut engages a holder which arrests the downward motion of the nut. A braking or clamping mechanism in the holder securely locks the nut in this position. With the nut thus locked the rotation of the threaded lead screw through the nut provides a positive feed action for the further downward travel of the spindle, lead screw and tap assembly. The tap thus feeds into the piece at the proper speed and pitch. After the cut is completed the rotation of the lead screw is reversed and the tap is screwed out of the piece. As soon as the tap leaves the work piece the locking mechanism can be released to free the lead screw nut and end the slow feed rate. Then the assembly of spindle, lead screw, tap, and lead screw nut can be rapidly raised upward away from the piece, using the rapid movement mechanism provided on the drill press or other mechanism which drives the spindle.

It is therefore a general object of the present invention to provide an improved machine tool for tapping operations which permits rapid travel of the cutting tool to and from the work piece while at the same time providing controlled advancing and retracting motions during actual tapping or retracting of the tap from the work piece.

Another object of the present invention is to provide an improved feed device for machine tools used for tapping operations using a lead screw feed nut which is releasably held in fixed relation to the work piece.

Another object of the present invention is to provide an improved feed device for machine tools used for tapping operations in which the lead screw feed nut is in fixed relation to the work piece only while the cutting tool is in engagement with the work piece and is released from the fixed position and is free to ride with the lead screw when the cutting tool leaves the work piece.

It is a further and additional object of the present invention to provide an improved rapidly retractable mechanism to feed and withdraw a tap in which the lead screw nut is releasably supported and the movement of the lead screw nut in the tap-engaging direction is arrested at proper position to engage the lead screw nut holding mechanism.

Another object of the present invention is to provide an improved rapidly retractable mechanism to feed and withdraw a tap in which the lead screw nut is releasably held in a fixed position by a clamping scissors mechanism only while the tap is in cutting engagement with the work.

Still another object of the present invention is to provide an improved releasable tap feeding mechanism which is simple, reliable, inexpensive, easily adjusted to work with taps of different pitch and is otherwise constructed to provide a maximum degree of practical utility.

Yet another object of the present invention is to provide a rapidly retractable mechanism to feed and withdraw a tap which itself serves as a strain relief device to prevent tap damage if the tap is not properly centered on the hole to be tapped.

The novel features which we believe to be characteristic of our invention are set forth with particularity in the appended claims. Our invention itself, however, both as to its organization and method of operation, together with further objects and advantages thereof, will best be understood by reference to the following description taken in conjunction with the accompanying drawings in which:

Figure 1 is a fragmentary perspective view of the spindle assembly of a drilling machine showing the retractable tap feed mechanism of the present invention with the lead screw nut in the released, or free riding, position;

Figure 2 is a cross-sectional view, through section 2—2 of Figure 1, showing the locking mechanism in the released position in solid lines and in the locked position, engaging the lead screw nut, in phantom lines;

Figure 3 is a cross-sectional view through section 3—3 of Figure 2 showing the holder and locking mechanism with the locking mechanism in the released position and the lead screw nut in the free-riding position with the upper and lower limits or travel of the lead screw nut shown in phantom lines;

Figure 4 is a fragmentary view similar to Figure 3 except that the locking mechanism is in the locked position, engaged with the lead screw nut;

Figure 5 is a perspective view of a manual feed drill press embodying an alternative construction of the present invention;

Figure 6 is a cross-sectional view through section 6—6 of Figure 5 showing the lead screw nut locked in the holder with the tap ready to begin the cutting operation;

Figure 7 shows a view similar to Figure 6 except that the lead screw nut is in the up position with the locking mechanism disengaged and with the tap clear of the work; and Figure 8 is a cross-sectional view looking inboard at section 8—8 of Figure 7 showing details of the locking mechanism.

Referring now to Figure 1, a drill press is shown which may be either of the manual advance type or of the mechanical advance type. The head, or spindle carrying portion is indicated generally at 10. The spindle 12 has a conical shaped bore at the end opposite the head which receives the lead screw 15. The lead screw 15 carries a chuck 14 which in turn carries the tap 16 so that the tap and lead screw rotate in unison with each other and with the spindle 12. The spindle 12 can be rapidly moved in the axial direction by means of a manually operated feed wheel (not shown) or by automatic means (not shown). The driving engagement between the spindle and the source of power is not shown but may be any of the types well known in the art.

The spindle 12 is carried by the drill press head 10 and is rotated by the drive unit of the machine (not shown). The lead screw 15 is engaged in a conical bore of the spindle 12 so as to rotate in unison with the spindle and is externally threaded with threads of the same pitch as desired in the work. The lead screw 15 has a conical bore at the end opposite the spindle, which bore receives the chuck 14 which may be any of the types well known in the art. The chuck 14 receives the tap 16.

A holder 17 extends over the drill press table 19, in a plane parallel to the table. The holder is supported by the drill press column 13 by means of a clamping device 18 and is adjustable to any desired height above the table 19. The holder 17 is affixed to the clamping device 18 by bolts seated in a groove in the holder, permitting small horizontal adjustments. The holder has a hole 17a (see Figure 4) which slidably receives the body of the lead screw nut but not the flange 20a of lead screw nut. The latter seats on the top of the holder 17 when the lead screw nut is in its down position.

The construction of the lead screw nut is shown in detail in Figure 3. The flange 20a, by engagement with the holder 17, arrests the downward movement of the nut. Semi-cylindrical slots 20c (Figure 2) are cut in the flange 20a to receive slidably the guide pins 21 and 22. The nut 20 is internally threaded at 20d, Figure 4, to receive the externally threaded lead screw 15.

A releasable braking or locking mechanism is provided to lock the lead screw nut 20 in operating position in the holder 17. A plate 23, parallel to the bottom surface of the holder, is held in spaced relationship to the holder by the holder face plate 17c and the spacer bar 17d. Two locking bars, 24 and 25, are affixed to the top surface of the plate 23 by means of pivot pins 24a and 25a. The locking bars extend under the holder and are free to rotate in a horizontal plane around their respective pivot pins 24a and 25a. At the end of each locking bar opposite its pivot point studs 24b and 25b extend upwardly to receive the lock actuator 26. The actuator 26 is movable in a direction normal to the side of the holder by means of a force (not shown) transmitted through the actuator shaft 26c. The studs 24b and 25b are received in elongated grooves 26a and 26b in the actuator 26. These grooves are cut in the bottom surface of the actuator at an angle to the line of motion of the actuator as shown in Figure 2. Thus, when the actuator is moved in toward the holder, the studs on the locking bars ride the actuator grooves to the outward positions, as shown in the solid lines of Figure 2. In this position the lead screw nut 20 is free to move up and down in the holder 17. When the actuator 26 is moved away from the holder to the position shown in phantom lines in Figure 2, the lugs 24b and 25b ride inwardly. The locking bars 24 and 25 thereupon engage the circular groove 20b in the lead screw nut 20 as shown in Figure 4.

The groove 20b may be beveled as shown to form a caming surface to force the locking bars out of engagement in the event the tap encounters unusual resistance in the work. In any event, the relatively thin locking bars themselves define shearing sections which tear to release the master nut 20 if the tap encounters undue resistance.

The operation of the retractable tap feed mechanism can best be understood by reference to Figures 3 and 4. Figure 3 shows the tap 16 in phantom lines at the time it is ready to begin its thread cutting operations. In this position the flange 20a of the lead screw nut 20 is in engagement with the top surface of the holder 17 and the locking mechanism actuator 26 is in the out position, causing the locking bars 24 and 25 to engage the groove 20b of the lead screw nut and lock the lead screw nut 20 in the holder 17 (see Figure 4). When thus locked with the holder 17, the nut 20 resists any normal upward thrust caused by the reaction of the work upon the tap. The rotation of the spindle 12 causes the tap 16, through the action of the rotating externally threaded lead screw 15 on the locked internally threaded nut 20, to feed into the work in proportion to the rotation. When the cut is completed, reversal of the direction of rotation of the spindle assembly 12 causes the tap 16 to feed in reverse direction out of the work until the tap is in approximately the same position as shown in the phantom lines of Figure 3 when the cut began. The reversal of the direction of the spindle can, for example, be achieved by means of an automatic control switch (not shown), actuated by the position of the spindle which reverses the drive motor or engages a reversing clutch.

At this time the actuator 26 is moved to the in position, spreading the locking bars 24 and 25 so that they become disengaged from the circular groove 20b in the lead screw nut. The actuator may be moved by compressed air or any other suitable means. Again, the operation of the actuator may be achieved automatically by a control switch (not shown) actuated by the position of the spindle or lead screw or by timing mechanism. After the lead screw nut 20 has been released from the holder 17 it is free to ascend with the spindle and lead screw with which it is in threaded engagement. The upward movement of the spindle may, for example, be automatically imparted by hydraulic or air operated mechanism (not shown) controlled, for example, by a timing device. Rotation of the nut is prevented by its slidable contact with the guide pins 21 and 22. The speed with which the spindle, lead screw, and lead screw nut assembly can be raised up away from the work is limited only by the limit of the vertical, disengaged, movement of the spindle of the machine.

Figure 3 shows the lead screw carrying the free riding nut up away from the holder. Since it is desirable, although not necessary, that the lead screw nut not become completely disengaged from the holder 17, the upward desirable limit of travel is as indicated in Figure 3. At the upper limit of the lead screw nut 20 shown in Figure 3, the tap is clear of the work 29 and the work piece 29 can be easily removed and replaced with a new work piece. Again, an automatic control switch (not shown), actuated by the movement of the spindle or lead screw, can stop or, if desired, reverse the drive motor when the lead screw nut 20 reaches the desired up position.

From this position the spindle, lead screw, and lead screw nut assembly can be quickly lowered to the point where the flanges of the nut 20a engage the fixed holder 17. The actuator 26 is then moved to the out position, clamping the locking bars 24 and 25 into the groove 20b of the lead screw nut 20, locking the nut 20 into the holder 17 as shown in Figure 4. In this position, the tap 16 is directly over the work piece and is ready to begin the controlled feed cutting.

An alternate construction of the retractable tap feed mechanism is shown in Figures 5, 6, 7 and 8. This installation is shown on a machine of the sensitive, or manual feed type, although the alternative construction shown in these figures may also be used in connection with a power feed machine. In the numbering system adapted, the last two digits of the numbers in Figures 5, 6, 7 and 8 correspond to analogous parts in Figures 1, 2, 3 and 4.

Figure 5 is a perspective of the spindle assembly of a drill press, having a manually operated feed wheel 111, showing the lead screw nut 120 in the locked position. Figure 6 shows the lead screw nut 120 in the down, or locked position, with the tap 116 immediately above the work 129 ready to begin the slow feed cutting operation. Figure 7 shows the lead screw nut 120 in the up, or released position, riding the lead screw with the tap clear of the work piece.

The releasable braking or locking mechanism used in this alternative construction to lock the lead screw nut 120 is defined by pins 125 and 126. Round holes 120b, drilled into the sides of the body of the lead screw nut 120 at opposed positions are aligned with the like holes 117a and 118a of holder 117. Slots 117b and 118b are cut in holder 117 immediately below and in communicating relation with holes 117a and 118a to receive pawls 123 and 124. Lugs 123a and 124a, extending from the ends of pawls 123 and 124, respectively, are received in transverse cavities 125a and 126a cut into the locking pins 125 and 126 at their inboard ends. Springs 127 and 128 exert pressure on the locking pins 125 and 126, respectively, to urge the pins towards the lead screw nut locking or engaging position of Figure 6. Latching faces 123b and 124b of pawls 123 and 124, respectively, engage the sides of the holder 117 when the locking machinism is withdraw from the lead screw nut 120 and allowed to drop to the engaged position of Figure 7. This holds the locking pins 125 and 126 in retracted position against the spring bias assuring that the pins will not interfere with the free downward movement of the lead screw nut 120.

In any embodiment of this invention the lead screw and the lead screw nut, which must have matching threads for engagement, and must have threads of the same pitch as the pitch desired in the work piece to produce the proper feed, can be interchanged with other matching lead screws and lead screw nuts of various pitches as required for the work.

It should be noted that a machine, incorporating any embodiment of this invention, can be operated as a conventional feed machine, if it should be desired, by merely leaving the lead screw nut locked in the holder during the entire operation cycle.

The device of the present invention can be incorporated as the positive feed mechanism for any machine tool of the type used for tapping or threading operations. Specifically, it can be used in conjunction with conventional machines of either the type with power feed or of the "sensitive type" to convert the same to a positive feed type. When used with a machine having a conventional positive feed for tapping operations, the conventional tapping feed would be disengaged.

While we have shown and described specific embodiments of the present invention it will, of course, be evident that various modifications and alternative constructions may be made without departing from the true spirit and scope thereof. In particular, the unit may be operated on an axis other than vertical; the releasable locking elements and the holder may be of other and different constructions performing the same functions; the tap may be secured by chuck means other than that shown, and other variations may be employed. We therefore intend by the appended claims to cover all such modifications and alternative constructions are come within their true spirit and scope.

What we claim as new and desire to secure by Letters Patent of the United States is:

1. In combination for threading the bore in a work piece; a vertically movable spindle; means operable to rotate the spindle; a lead screw carried by the spindle and adapted to receive a tap; a tap received by said lead screw and operable when rotated to thread the bore in the work piece; a lead screw nut received on the lead screw; a holder adapted to seat against the lead screw nut as the lead screw is moved towards the work, thereby holding the tap in position to begin tapping operations; scissors members pivotally mounted on the holder to anchor the nut against lifting movement in relation to the work; means defining camming surfaces between the scissors members and the nut to break engagement therebetween when the nut is subjected to excessive lifting movement; a movable element; and means defining camming surfaces interconnecting the movable element and the scissors members, respectively, to actuate the same as the movable element moves, thereby allowing free bodily movement of the lead screw, tap, and nut away from the work to change the work piece, the holder having a vertically extending portion defining ways conformed to receive the nut and hold the same against rotation in all vertical positions of the spindle.

2. A positive feed device for use on a tapping machine of the type having a head supported by a column and an axially movable rotating spindle extending from the head and having means for reversing the direction of rotation thereof, the positive feed device comprising: a lead screw on the spindle and having external threads of the same pitch as the threads to be cut; means at the free end of the lead screw to receive the tap; a lead screw nut threadedly received on the lead screw and carried solely by the lead screw and spindle assembly for axial movement; a holder adjustably mounted on the column having conformations to receive the nut snugly but slidably therein and engage the same to arrest downward axial movement thereof as the tap approaches work-engaging position, the holder having an upstanding pin in engagement with the margin of the nut to hold the same against rotation; scissors members pivotally mounted on the holder to anchor the nut within the holder and against lifting movement in relation to the work; means defining camming surfaces between the scissors members and the nut to break engagement therebetween when the nut is subjected to excessive lifting movement; a movable element; and means defining camming surfaces interconnecting the movable element and the scissors members, respectively, to actuate the latter between a clamping position and a release position as the movable element moves, thereby allowing free bodily movement of the lead screw, tap, and nut away from the work to change the work piece.

References Cited in the file of this patent

UNITED STATES PATENTS

| | | |
|---|---|---|
| 141,299 | Walworth | July 29, 1873 |
| 355,737 | Wells | Jan. 11, 1887 |
| 2,165,396 | Mansfield | July 11, 1939 |
| 2,245,032 | Fisher | Aug. 26, 1941 |
| 2,500,540 | Graves | Mar. 14, 1950 |
| 2,501,298 | Winchell | Mar. 21, 1950 |